US010289701B2

(12) United States Patent
Mitchell (10) Patent No.: US 10,289,701 B2
(45) Date of Patent: May 14, 2019

(54) SELECTIVELY CACHING SEQUENTIAL DATA ITEMS

(71) Applicant: Merge Healthcare Incorporated, Chicago, IL (US)

(72) Inventor: Robert Mitchell, Mississauga (CA)

(73) Assignee: Merge Healthcare Incorporated, Chicago, IL (US)

( * ) Notice: Subject to any disclaimer, the term of this patent is extended or adjusted under 35 U.S.C. 154(b) by 179 days.

(21) Appl. No.: 15/288,469

(22) Filed: Oct. 7, 2016

(65) Prior Publication Data

US 2018/0101479 A1 Apr. 12, 2018

(51) Int. Cl.
*G06F 3/06* (2006.01)
*G06F 17/30* (2006.01)

(52) U.S. Cl.
CPC ...... *G06F 17/30268* (2013.01); *G06F 3/0611* (2013.01); *G06F 3/0653* (2013.01); *G06F 3/0656* (2013.01); *G06F 3/0671* (2013.01); *G06F 17/3028* (2013.01); *G06F 17/30902* (2013.01)

(58) Field of Classification Search
CPC ........... G06F 12/0893; G06F 17/30268; G06F 17/3028; G06F 2212/1008; G06F 2212/455
See application file for complete search history.

(56) References Cited

U.S. PATENT DOCUMENTS 6,996,676 B2 2/2006 Megiddo et al.
2013/0103647 A1* 4/2013 Ho .................... G06F 17/30073
707/661

* cited by examiner

*Primary Examiner* — Reginald G Bragdon
*Assistant Examiner* — Edward Wang
(74) *Attorney, Agent, or Firm* — Michael Best & Friedrich LLP (57) ABSTRACT

Embodiments of the invention provide methods and systems for caching data. One method includes receiving, through a user device, a selection of a set of data items, and determining, with an electronic processor, a storage rate, wherein the storage rate includes an integer (N). The method also include retrieving the set of data items and storing every Nth data item included in the set of data items to a non-transitory memory cache while discarding intervening data items.

17 Claims, 5 Drawing Sheets

SELECTIVELY CACHING SEQUENTIAL DATA ITEMS

BACKGROUND

Embodiments of the invention provide methods and systems for caching data items, such as a set of images.

SUMMARY

Within the medical industry, a user (e.g., a physician or a radiologist) views medical images included in an image study. In some embodiments, a user may remotely access medical images using a computing device, such as a smart phone or a tablet computer, that communicates with an image server over at least one communication network.

In many situations, a user views a set medical images sequentially (e.g., as a cine sequence where each image is displayed for a predetermined period of time) and repetitively views the set of images. Therefore, when a user remotely accesses images, downloading or receiving all of the images once and locally storing the images allows the user to repetitively display the images as needed without experiencing delays due to bandwidth or connection constraints. However, in many situations, the entire set of medical images cannot be stored on the computing device given the number of images and the memory capabilities of the computing device. For example, a cardiology study may include 15,000 or more images.

Therefore, a computing device typically downloads and stores images in a memory cache and discards stored images as needed to make room for incoming images. Typical caching methodologies (e.g., commonly used for page caching) follow a first-in, first-out methodology that discards the oldest data (i.e., the least recently used data). However, this methodology is inefficient when images need to be replayed multiple times. Furthermore, delays caused by downloading or receiving images may interrupt the user's review and analysis of the displayed images.

Accordingly, embodiments of the invention provide methods and systems for caching data. One method includes receiving, through a user device, a selection of a set of data items, and determining, with an electronic processor, a storage rate, wherein the storage rate includes an integer (N). The method also includes retrieving the set of data items and storing every Nth data item included in the set of data items to a non-transitory memory cache while discarding intervening data items.

Another embodiment provides a system for caching data. The system may include a non-transitory memory cache and an electronic processor. The electronic processor is configured to receive a selection of a set of data items and to determine a storage rate, wherein the storage rate includes an integer (N). The electronic processor is also configured to retrieve the set of data items and store every Nth data item included in the set of data items to the non-transitory memory cache while discarding intervening data items.

Yet another embodiment provides a method for caching data. The method includes receiving, through a user device, a selection of a set of data items, and determining, with an electronic processor, a storage rate, wherein the storage rate includes an integer (N). The method also includes retrieving the set of data items and discarding every Nth data item included in the set of data items to a non-transitory memory cache while storing intervening data items.

Other aspects of the invention will become apparent by consideration of the detailed description and accompanying drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

In addition, it should be understood that embodiments of the invention may include hardware, software, and electronic components that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable memory) and executed by an electronic processor to perform specific functionality. As such, it should be noted that a plurality of hardware and software based devices, as well as a plurality of structural components may be used to implement embodiments of the invention.

Figure 1:
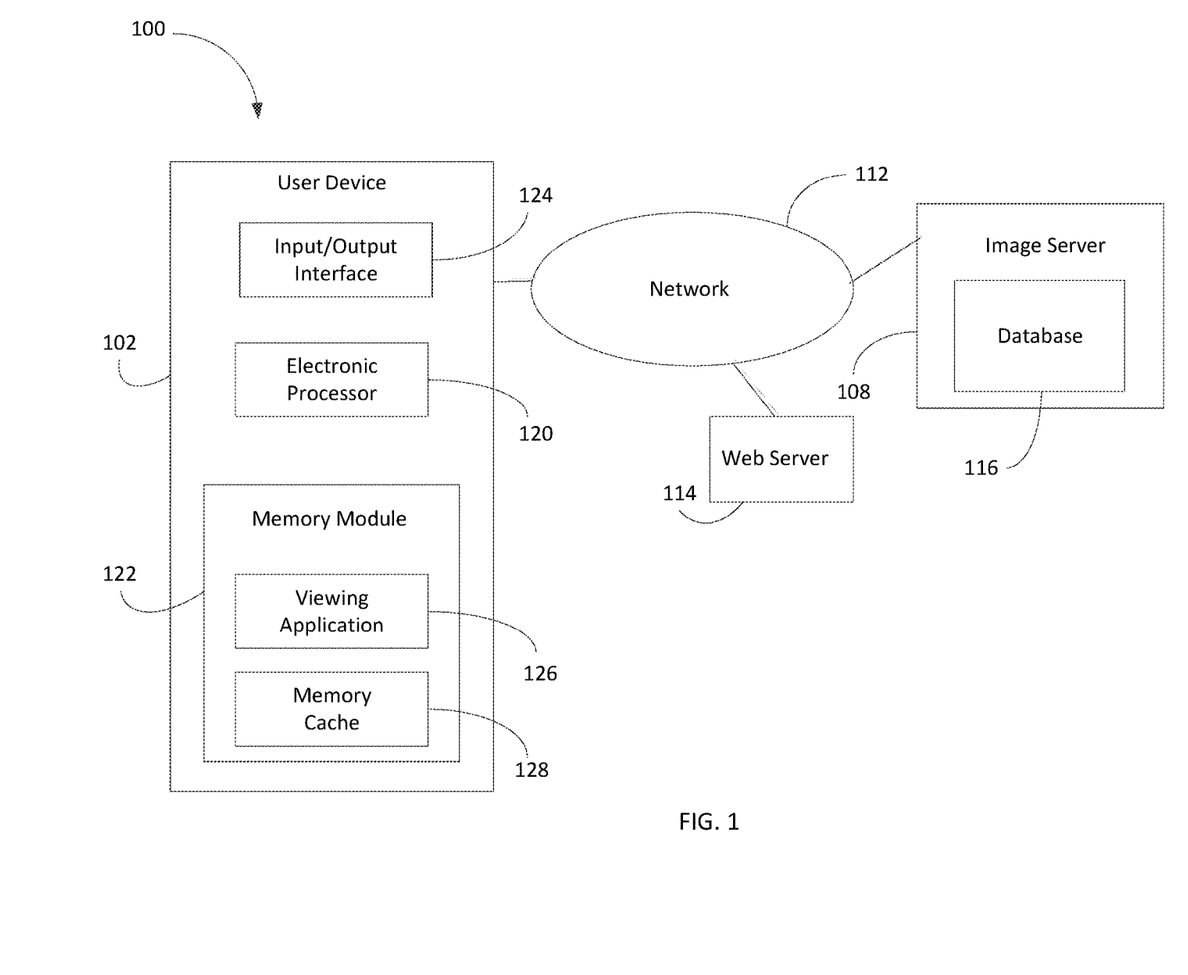
FIG. 1 schematically illustrates a system for viewing data items using a viewing application.

FIG. 1 schematically illustrates a system 100 for viewing a sequence of data items, such as a set of medical images generated during an image study. It should be understood that FIG. 1 illustrates only one example of a system 100 for viewing a sequence of data items and that other configurations are possible. As shown in FIG. 1, the system 100 includes a user device 102 that communicates with an external image server 108 over a network 112. The network 112 may include the Internet, a local area network (LAN), a wide area network (WAN), other computer networks, or combinations thereof. In some embodiments, one or more intermediate devices establish communication between the user device 102 and the image server 108. For example, as illustrated in FIG. 1, in some embodiments, the user device 102 communicates with a web server 114 that accesses the image server 108 to retrieve images requested by the user device 102 and transmits the requested images back to the user device 102.

The image server 108 stores data items, such as medical images. For example, in some embodiments, the image server 108 includes a database 116 that stores images from one or more imaging modalities, such as a radiology imager, x-ray device, magnetic resonance imaging (MRI) device, computed tomography (CT) device, ultrasound device, thermo-graphic imaging device, or another imaging device that generates a medical image. Images stored to the database 116 may be grouped into sets of sequential images included as part of an image study. For example, in some embodiments, a set of images is sequentially numbered (e.g., as part of a filename). Therefore, an image stored in the database 116 may be associated with a particular sequence of images and have a predefined order within the plurality of images included in the sequence of images.

The user device 102 includes a computing device configured to connect to the network 112 and execute software applications. For example, the user device 102 may be a personal computer, a kiosk, a tablet computer, a laptop computer, a smart phone, a smart watch or other wearable device, or a smart television. To interact with a user, the user device 102 includes one or more input mechanisms (e.g., a touchscreen, push buttons, scroll wheels, a keyboard, a mouse, a microphone, and the like) and one or more output mechanisms (e.g., a touchscreen, a speaker, and the like).

As illustrated in FIG. 1, the user device 102 also includes an electronic processor 120 (e.g., a microprocessor or other programmable device), a non-transitory computer-readable memory module 122, and an input/output interface 124. The input/output interface 124 allows the user device 102 to communicate with the network 112 and exchange data with the image server 108 and/or the web server 114. The memory module 122 stores data and instructions executable by the electronic processor 120. For example, as illustrated in FIG. 1, the memory module 122 stores a viewing application 126. The memory module 122 also includes a memory cache 128. The memory cache 128 represents memory available to the viewing application 126 (e.g., for storing downloaded images). It should be understood that the memory cache 128 may be included in a memory module separate from the memory module 122 where the viewing application 126 is stored.

The viewing application 126, when executed by the electronic processor 120, is configured to retrieve images from the image server 108 and display the images, such as within a cine sequence (e.g., as a slideshow). It should be understood that, in some embodiments, the viewing application 126 is a browser application. The viewing application 126 generates a graphical user interface (GUI) that is displayed on an output of the user device 102 (e.g., a touchscreen or display). The GUI receives user input, such as a selection of a set of images stored in the image server 108 (e.g., through the touchscreen or separate input mechanisms, such as buttons, a keyboard, and the like). The viewing application 126 uses the selection to communicate with the image server 108 through the network 112 and download the selected set of images. The viewing application 126 determines the size (e.g., how many data items, a number of bytes, and the like) of the selection and compares the determined size of the selection to size of the memory cache 128 to determine whether the selected set of images is storable within the memory cache 128 (i.e., the size of the selected set of images is equal or less than the size of the memory cache 128). If the selected set of images is storable within the memory cache 128, all of the images included in the set of images are downloaded and stored in the memory cache 128. Therefore, after being downloaded once, the images may be retrieved from the memory cache 128 as necessary to replay the images.

Figure 2A:
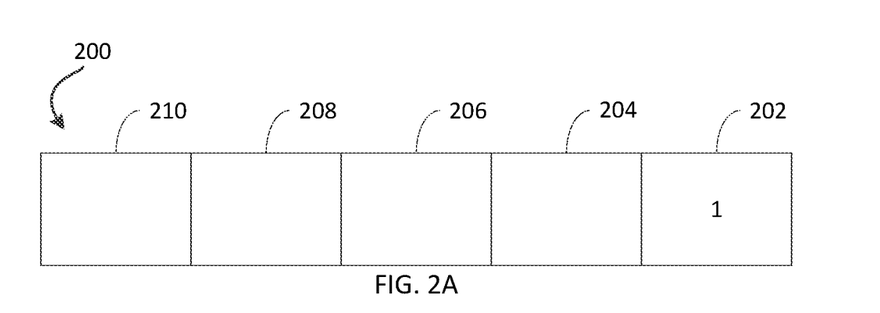
FIGS. 2A-2F schematically illustrates storing data items to a memory cache using a first-in, first-out methodology.
Figure 2B:
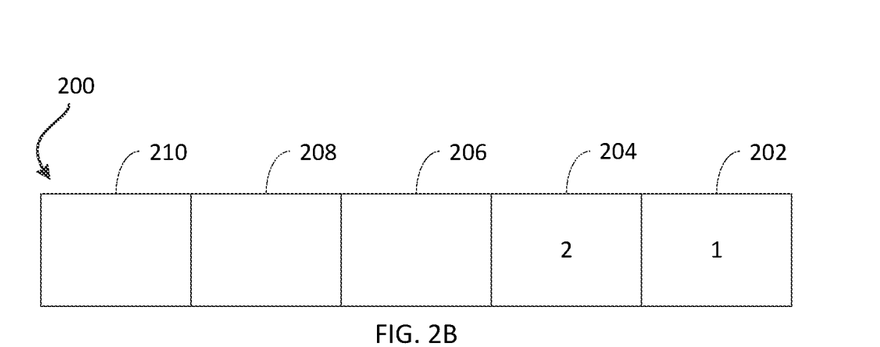
Figure 2C:
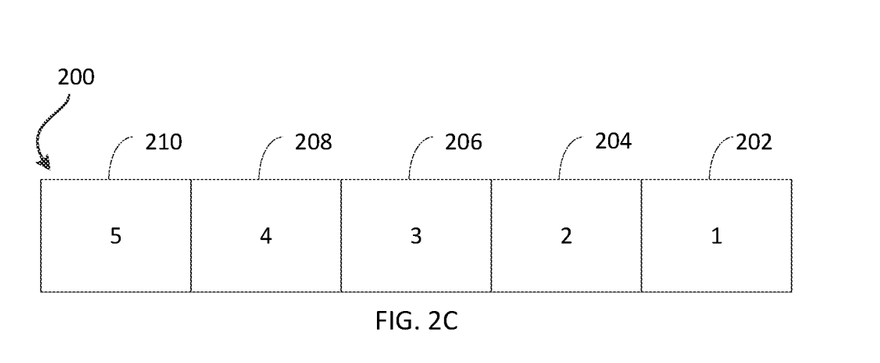
Figure 2D:
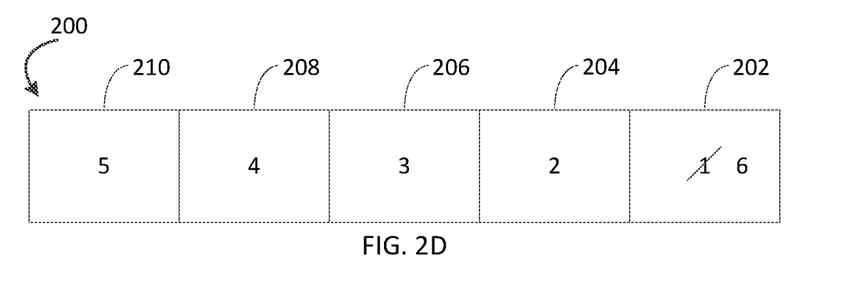
Figure 2E:
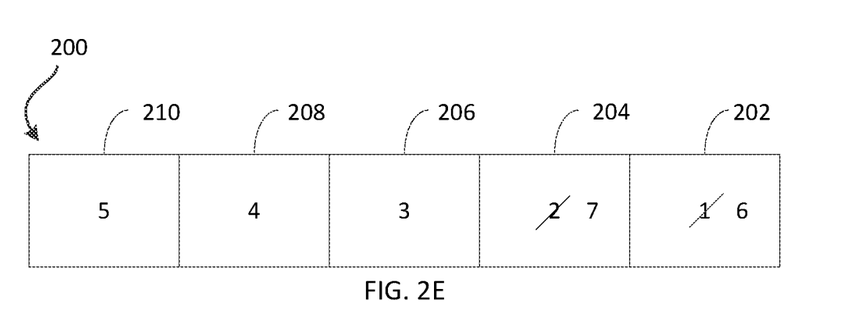
Figure 2F:
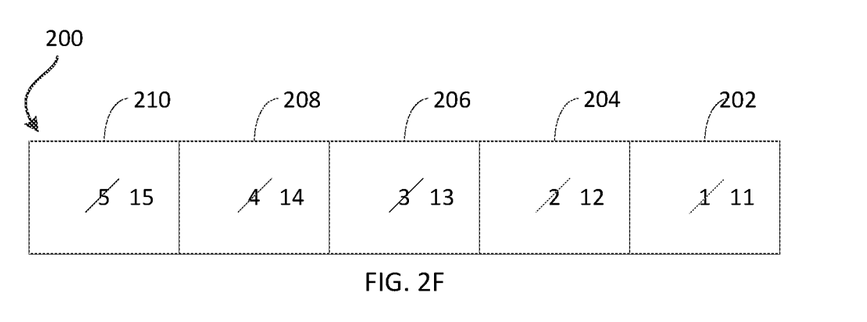

However, as noted above, in many situations, the entire set of images does not fit within the memory cache 128. Therefore, a caching methodology is applied to discard images stored in the memory cache 128 to make room for new images downloaded from the image server 108. For example, FIGS. 2A-2F illustrate using a first-in, first-out caching methodology to download fifteen example sequential data items 1, 2, 3, 4, 5, 6, 7, 8, 9, 10, 11, 12, 13, 14, and 15 using an example memory cache 200 having five memory locations 202, 204, 206, 208, and 210. FIG. 2A illustrates the first data item 1 being loaded into the memory location 202, and FIG. 2B illustrates the second data item 2 being loaded into the memory location 204. As illustrated in FIG. 2C, as the data items are downloaded, the first five data items 1, 2, 3, 4, and 5 are initially stored in memory locations 202, 204, 206, 208, and 210, respectively. When the sixth data item 6 is downloaded, the memory cache 200 is full, which means that one of the stored data items needs to be discarded. Using a first-in, first-out methodology, the least-recently used data item is discarded from the memory cache 200 to make room for incoming data. Therefore, in the situation illustrated in FIG. 2C, the first data item 1 was least recently used. Thus, as illustrated in FIG. 2D, the first data item 1 is discarded from the memory cache 200 and the sixth data item 6 is stored. Similarly, when the seventh data item 7 is downloaded, the second data item 2 is discarded as illustrated in FIG. 2E. Therefore, as shown in FIG. 2F, by the time the fifteenth data item 15 is downloaded, the memory cache 200 stores the eleventh data item 11, the twelfth data item 12, the thirteenth data item 13, the fourteenth data item 14, and the fifteenth data item 15.

Accordingly, after initially downloading and displaying the fifteen sequential data items, the memory cache 200 stores the last five data items 11, 12, 13, 14, and 15. Thus, if the user wants to display the fifteen sequential data items again, the first data item 1 must be re-downloaded. In fact, since none of the first five data items 1, 2, 3, 4, and 5 are stored to the memory cache 200, all of these data items will need to be re-downloaded. Also, as these first five data items are downloaded and stored to the memory cache 200, the last five data items will be replaced. Therefore, after the first five data items are re-downloaded, the last five data items will eventually also need to be re-downloaded to finish displaying the data items to the user.

In addition, depending on the bandwidth between the user device 102 and the image server 108, the user device 102 may not be able to download the needed images quickly enough to display the sequence of data items without interruption. For example, if the user device 102 displays data items at a rate of one data item every two seconds but the user device 102 downloads data items at a rate of one data item every three seconds, there will be delay in displaying the data items.

Accordingly, the user device 102 uses a selective caching methodology that selectively stores (and, hence, selectively discards) downloaded data items to reduce the number of downloads needed to re-display data items and to allow sufficient time to download a data item when needed. In particular, the selective caching methodology downloads a data item included in a sequence of data items and, after downloading, each data item, determines whether to store or maintain the downloaded data item in a memory cache or discard the downloaded data item based on the data item's position within a sequence of data items. For example, the caching methodology applies a storage rate to identify whether to store or discard a data item from the memory cache 200.

In one embodiment, the storage rate includes an integer (N), which indicates that every Nth data item downloaded as part of a sequence of data items is stored while intervening data items are discarded. A value for N may be defined based on the number (L) of data items included in the sequence of data items and the number of data items that may be stored to the memory cache (C). In particular, a value for N may be defined by the number (L) divided by the number (C) (e.g., rounded up to the next integer). For example, if there are fifteen data items to be displayed (i.e., L is fifteen) and a memory cache may store up to five data items (i.e., C is five), the value of N may be set to three (i.e., L divided by C), which causes every third data item of the sequence to be stored while intervening data items are discarded.

Figure 3A:
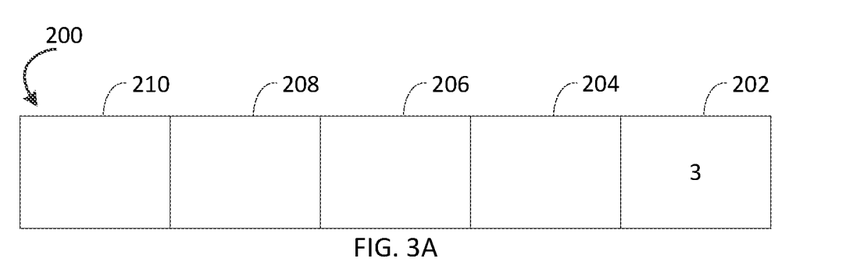
FIGS. 3A-3C schematically illustrates storing data items to a memory cache using a selective methodology.
Figure 3B:
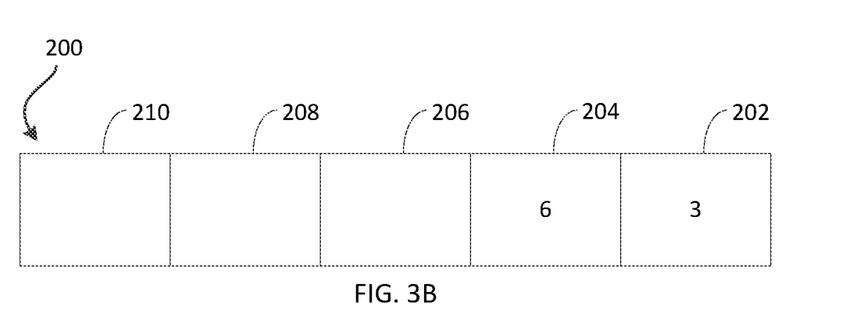
Figure 3C:
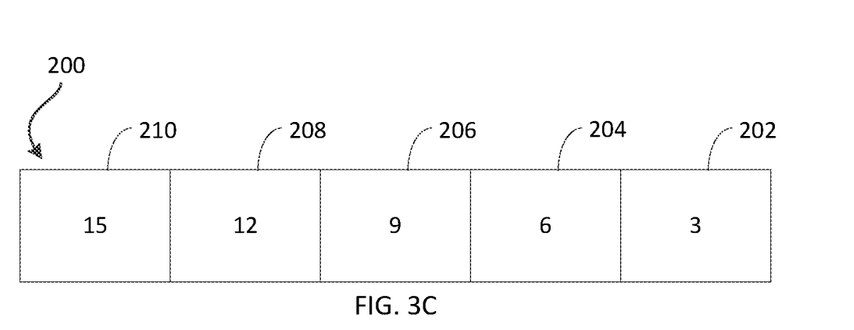

By way of example, FIGS. 3A-3C illustrate one embodiment of using the storage rate to download the same data items described above with respect to FIGS. 2A-2F. In this example, the storage rate may be set based on the number of data items (i.e., fifteen) and the number of data items that may be stored to the memory cache 200 (i.e., five). In particular, the value of N may be set to three (i.e., fifteen divided by five).

Using a storage rate of three causes every third data item to be stored or retained while the intervening data items are discarded. Accordingly, after the first data item 1 is downloaded and displayed, the first data item 1 is discarded and is not maintained in the memory cache 200 (e.g., beyond any storage needed while the first data item 1 is being displayed). Similarly, the second data item 2 is downloaded and displayed, but is not maintained in the memory cache 200 (e.g., beyond any storage needed while the second data item 2 is being displayed). However, as illustrated in FIG. 3A, when the third data item 3 is downloaded and displayed, the third data item 3 is stored in the memory location 202 of the memory cache 200 because the storage rate is three and the third data item 3 represents a third data item in the sequence.

When the fourth data item 4 and the fifth data item 5 are downloaded and displayed, the fourth data item 4 and the fifth data item 5 are not maintained in the memory cache 200 (e.g., beyond any storage needed while the fourth data item 4 and the fifth data item 5 are being displayed). However, as illustrated in FIG. 3B, when the sixth data item 6 is downloaded and displayed, the sixth data item 6 is stored in the memory location 204 of the memory cache 200 because it is the next third data item in the sequence. Accordingly, as illustrated in FIG. 3C, after all fifteen data items have been initially downloaded and displayed, the memory cache 200 stores the third data item 3, the sixth data item 6, the ninth data item 9, the twelfth data item 12, and the fifteenth data item 15. Therefore, if the user subsequently wants to display the fifteen data items again, the third data item 3, sixth data item 6, ninth data item 9, twelfth data item 12, and fifteenth data item 15 are available in the memory cache 200 and do not have to be re-downloaded. Furthermore, data items of the sequence that are not already stored in the memory cache 200 may be downloaded while the data items stored in the memory cache are displayed. For example, although the fourth data item 4 is not stored in the memory cache 200, the fourth data item 4 may be downloaded while the third data item 3 is being displayed, which allows the fourth data item 4 to be downloaded without delaying the display of data items.

Figure 4:
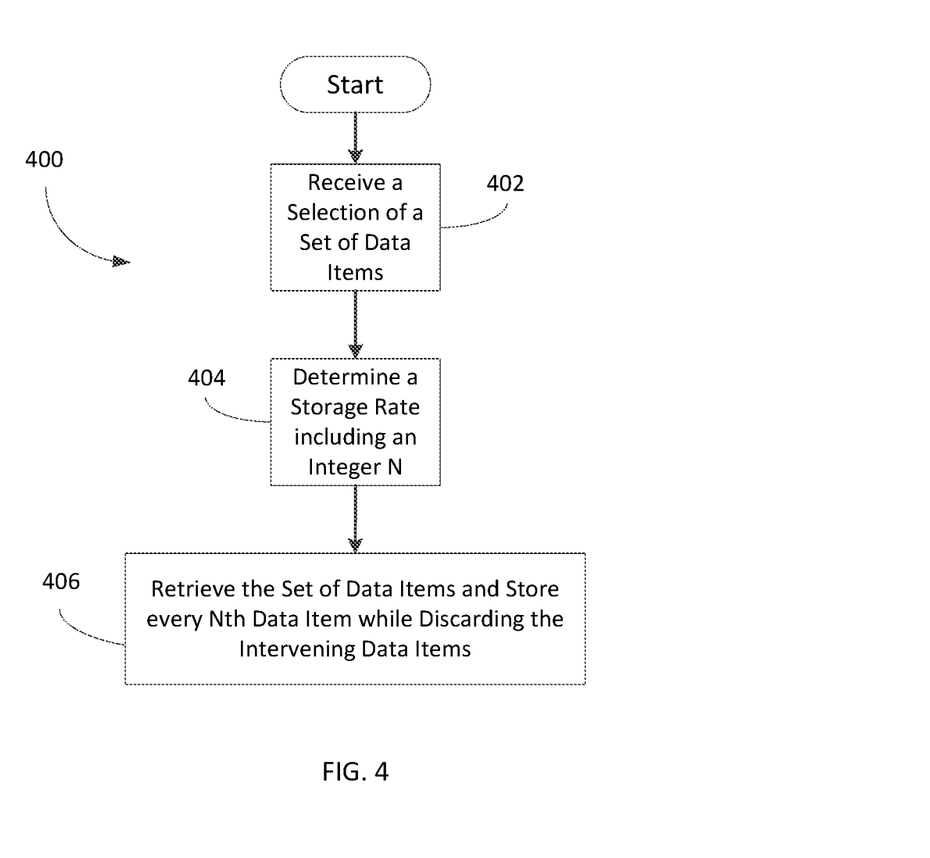
FIG. 4 is a flow chart illustrating a method of caching data items performed by the system of FIG. 1.

For example, FIG. 4 illustrates a method 400 performed by the user device 102 to display a sequence of data items using the selective caching methodology. It should be understood that the functionality illustrated in FIG. 4 may be performed by the viewing application 126 executed by the user device 102 (i.e., the electronic processor 120 included in the user device 102). Alternatively or in addition, the functionality or portions thereof may be performed by an operating system executed by the user device 102 (i.e., the electronic processor 120 included in the user device 102).

As illustrated in FIG. 4, the user device 102 receives a selection of a set of data items for display (at block 402). As noted above, the viewing application 126 may be configured to generate a GUI that receives user input, such as a selection of a set of data items. In some embodiments, a user may select a set of data items by providing a unique identifier for the set of data items (e.g., a unique identifier for an image study) or another identifier that may be used to retrieve a particular set of data items (e.g., a patient identifier, an image study data, and the like). In other embodiments, a user may select a set of data items by selecting the set from a list of available sets of data items (e.g., as provided by the image server 108).

The user device 102 determines a storage rate for the selected set of data items (at block 404). For example, the user device 102 may determine how many data items are included in the selected set of data items. In some embodiments, the user device 102 requests this information from the image server 108. In other embodiments, this information may have been previously provided by the image server 108 or another source (e.g., as part of a list of available image studies). For example, in some embodiments, the image server 108 provides this information as part of the providing the requested data items. In some embodiments, in addition to or as an alternative to determining the number of the data items included in the selected set of data items, the user device 102 determines a total size of the set of data items (e.g., in bits, bytes, gigabytes, or other suitable unit of measurement), an average size of a data item included in the set, or the like.

The user device 102 uses the number of data items to set the storage rate (i.e., set a value for N). In particular, as noted above, the user device 102 sets the storage rate by dividing the number of data items included in the selected set by the number of data items storable within the memory cache 128 (i.e., that fit within the memory cache 128). For example, when there are 100 data items included in the selected state and the memory cache 128 can store ten of these data items at a time, the storage rate is set to ten indicating that every tenth data item will be stored while the intervening data items are discarded. It should be understood that in some embodiments, the number of data items that can be stored to the memory cache 128 may be determined by dividing a size of the data items (e.g., an average size of individual data items) by the total size of the memory cache 128 (e.g., measured in bits, bytes, gigabytes, or other suitable unit of measurement).

The user device 102 retrieves the selected set of data items (e.g., from the image server 108) and stores and discards data items to the memory cache 128 based on the determined storage rate (at block 406). For example, using the example provided above, when the storage rate is set to ten, the user device 102 keeps every tenth data item and discards intervening data items. In particular, when the selected set of data items includes a sequence of images including a plurality of images having a predefined order, the user device 102 displays the plurality of images based on the predefined order and stores every tenth image included in the plurality of images based on the predefined order while discarding intervening images included in plurality of images based on the predefined order.

Alternatively, in another embodiment, a value for N may be defined based on a display rate of the user device 102 (J) and the bandwidth between the user device 102 and the image server 108 (i.e., the download rate) (K). In particular, a value for N may be defined by the number (J) divided by the number (K) (e.g., rounded up to the next integer). For example, if the user device 102 displays data items at a rate of five data items per second (i.e., J is five) and downloads data items at a rate of two data items per second (i.e., K is two), the value of N may be set to three. Accordingly, in these embodiments, the user device 102 determines the display rate and the download rate in addition to or as an alternative to determining the number of data items included in the selected set and the number of data items that may be stored to the memory cache 128.

Setting the storage rate based on the display rate and the download rate of the user device 102 stores enough data items to the memory cache to provide sufficient time to download a needed image. Also, in some embodiments, a first value for N may be calculated based on the number of data items and the size of the memory cache and a second value for N may be calculated based on the display rate and the download rate. The values may then be compared or combined to determine either a size of the cache memory, a maximum display rate, or an optimized combination of both. Also, in some embodiments, the values of N may be compared to identify an optimized value of N (e.g., the greater, lesser, or average of the two values of N).

Also, it should also be understood that in some embodiments, the value of N may be considered a discard rate. For example, when the value of N is three, rather than storing every third data item and discarding intervening data items, data items may be stored except for every third data item, which is discarded. In some embodiments, when the value of N is set based on the display rate and the download rate, N may be used as a discard rate rather than a storage rate.

Thus, the invention provides, among other things, a methods and systems for caching data items, such as sequentially-displayed data items. It should also be understood that although embodiments of the invention have been described in terms of medical images, embodiments of the invention may be used to display other types of data items, including non-medical images or videos. For example, users often display videos on social media websites and other webpages (e.g., YouTube® and Facebook®) that are repetitively displayed. Therefore, the selective caching methodology described in the present application may also be used to efficiently download these social videos and any videos or sequential data items that are often replayed.

Furthermore, it should be understood that although embodiments of the invention have been described in terms of downloading data items to a memory cache from an external device (e.g., the external image server 108), embodiments of the invention may be used for retrieving data items that are stored to a local storage medium of the user device 102 (e.g., on a hard drive) but are transferred to a local (e.g., fast-access) memory cache. For example, in some embodiments, the methods and system described herein may be used to retrieve data items stored in the memory module 122 for selective storage in the memory cache 128.

In addition, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Also, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in computer readable storage medium with the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or server. In the later scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described here in with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Various features and advantages of the invention are set forth in the following claims.

What is claimed is:

1. A method for caching data items, the method comprising:
   receiving, through a user device, a selection of a set of data items;
   determining, with an electronic processor, a storage rate, wherein the storage rate includes an integer (N) and wherein determining the storage rate includes
      determining a number of data items storable to a non-transitory memory cache,
      determining a number of data items within the set of data items, and
      determining the integer N by dividing the number of data items within the set of data items by the number of data items storable to the non-transitory memory cache; and
   retrieving the set of data items and storing every Nth data item included in the set of data items to the non-transitory memory cache while discarding intervening data items.

2. The method of claim 1, wherein determining the storage rate includes:
   determining a download rate of the user device displaying the set of data items;
   determining a display rate of the user device; and
   determining the integer N by dividing the download rate of the user device by the display rate of the user device.

3. The method of claim 1, wherein receiving the selection of the set of data items includes receiving a selection of a sequence of images, wherein the sequence of images includes a plurality of images having a predefined order.

4. The method of claim 3, further comprising displaying the plurality of images based on the predefined order.

5. The method of claim 3, wherein storing every Nth data item included in the set of data items to the non-transitory memory cache while discarding intervening data items includes storing every Nth image included in the plurality of images based on the predefined order while discarding intervening images included in the plurality of images based on the predefined order.

6. The method of claim 1, wherein retrieving the set of data items includes retrieving the set of data items from an external image server.

7. The method of claim 1, wherein retrieving the set of data items includes retrieving the set of data items from a local storage medium.

8. A system for caching data items, the system comprising:
   a non-transitory memory cache; and
   an electronic processor configured to
      receive a selection of a set of data items,
      determine a storage rate, wherein the storage rate includes an integer (N), and
      retrieve the set of data items and store every Nth data item included in the set of data items to the non-transitory memory cache while discarding intervening data items,
   wherein the electronic processor is configured to determine the storage rate by determining a number of data items storable to the non-transitory memory cache, determining a number of data items within the set of data items, and determining the integer N by dividing the number of data items within the set of data items by the number of data items storable to the non-transitory memory cache.

9. The system of claim 8, wherein the electronic processor is configured to determine the storage rate by determining a download rate of a device displaying the set of data items, determining a display rate of the device, and determining the integer N by dividing the download rate of the device by the display rate of the device.

10. The system of claim 8, wherein the set of data items includes a sequence of images including a plurality of images having a predefined order.

11. The system of claim 10, wherein the electronic processor is further configured to display the plurality of images based on the predefined order.

12. The system of claim 10, wherein the electronic processor is configured to store every Nth data item included in the set of data items to the non-transitory memory cache while discarding intervening data items by storing every Nth image included in the plurality of images based on the predefined order while discarding intervening images included in the plurality of images based on the predefined order.

13. The system of claim 8, wherein the electronic processor is configured to retrieve the set of data items from an external image server.

14. The system of claim 8, wherein the electronic processor is configured to retrieve the set of data items from a local storage medium.

15. A method for caching data items, the method comprising:

receiving, through a user device, a selection of a set of data items;

determining, with an electronic processor, a storage rate, wherein the storage rate includes an integer (N) and wherein determining the storage rate includes determining a download rate of the user device displaying the set of data items;

determining a display rate of the user device; and determining the integer N by dividing the download rate of the user device by the display rate of the user device; and retrieving the set of data items and discarding every Nth data item included in the set of data items to a non-transitory memory cache while storing intervening data items.

16. The method of claim 15, wherein determining the storage rate includes:

determining a number of data items storable to the non-transitory memory cache;

determining a number of data items within the set of data items; and determining the integer N by dividing the number of data items within the set of data items by the number of data items storable to the non-transitory memory cache.

17. The method of claim 15, wherein receiving the selection of the set of data items includes receiving a selection of a sequence of images, wherein the sequence of images includes a plurality of images having a predefined order.

* * * * *